(12) United States Patent
Smith

(10) Patent No.: US 10,088,306 B1
(45) Date of Patent: Oct. 2, 2018

(54) LEVELING AND DISTANCE-MEASURING SYSTEMS

(71) Applicant: Wayne Cooper Smith, Reno, NV (US)

(72) Inventor: Wayne Cooper Smith, Reno, NV (US)

( * ) Notice: Subject to any disclaimer, the term of this patent is extended or adjusted under 35 U.S.C. 154(b) by 202 days.

(21) Appl. No.: 15/199,993

(22) Filed: Jul. 1, 2016

Related U.S. Application Data

(60) Provisional application No. 62/188,592, filed on Jul. 3, 2015.

(51) Int. Cl.
| | | |
|---|---|---|
| *G01C 15/00* | (2006.01) | |
| *G01C 3/06* | (2006.01) | |
| *G01C 9/06* | (2006.01) | |
| *G01V 3/02* | (2006.01) | |

(52) U.S. Cl.
CPC .................. *G01C 3/06* (2013.01); *G01C 9/06* (2013.01); *G01C 15/00* (2013.01); *G01V 3/02* (2013.01); *G01C 2009/066* (2013.01)

(58) Field of Classification Search
CPC ............. G01C 3/06; G01C 3/00; G01C 15/00
USPC ...... 33/228, 286, 290, 291; 324/67; 372/109
See application file for complete search history.

(56) References Cited

U.S. PATENT DOCUMENTS

| | | | | |
|---|---|---|---|---|
| 6,249,113 B1 * | 6/2001 | Krantz | ..................... | G01V 3/15 324/67 |
| 6,259,241 B1 * | 7/2001 | Krantz | ..................... | G01V 3/15 324/156 |
| 6,459,483 B1 | 10/2002 | Shafer et al. | | |
| 6,502,319 B1 * | 1/2003 | Goodrich | ............. | G01C 15/004 33/227 |
| 7,027,480 B2 | 4/2006 | Marshall et al. | | |
| 7,350,303 B2 | 4/2008 | Rock et al. | | |
| 7,743,520 B1 * | 6/2010 | Jiorle | ........................ | G01C 9/28 33/366.11 |
| 7,756,665 B2 * | 7/2010 | Spanski | .................. | G01B 17/00 33/700 |
| 9,518,823 B2 * | 12/2016 | Hill | ....................... | G01C 15/004 |
| 9,797,756 B2 * | 10/2017 | Silva | ......................... | G01D 5/40 |
| 2004/0083614 A1 * | 5/2004 | Raskin | .................. | G01C 15/004 33/286 |
| 2004/0118001 A1 | 6/2004 | Turpin | | |
| 2005/0078303 A1 * | 4/2005 | Murray | ..................... | G01C 9/06 356/138 |
| 2006/0002233 A1 * | 1/2006 | Malard | ................. | G01C 15/008 367/128 |
| 2006/0179672 A1 | 7/2006 | Tacklind | | |

(Continued)

*Primary Examiner* — Christopher Fulton
(74) *Attorney, Agent, or Firm* — Integrity Patent Group, PLC; Edwin Wold

(57) ABSTRACT

A system for leveling and distance-measuring, the system including a housing, a self-leveling-laser fixed to the housing, an electronic-stud-finder also fixed to the housing, a distance-measurer having distance-measuring-circuitry, a display detachably coupled to the housing, and an audio-output including variable-frequency-output and variable-tone-output. The system for leveling and distance-measuring also includes at least one mode-selector-switch, configured to select a mode-of-operation of the system from at least a leveling mode and a distance-measuring mode. The system is structured and arranged to determine level, plumb, measure distances, locate studs embedded within walls, and measure a width of the studs.

20 Claims, 5 Drawing Sheets

(56) References Cited

U.S. PATENT DOCUMENTS

| | | | |
|---|---|---|---|
| 2007/0200547 A1* | 8/2007 | Chen .................. | G01V 3/15 |
| | | | 324/67 |
| 2008/0147345 A1* | 6/2008 | Willcock ............ | G01B 21/26 |
| | | | 702/87 |
| 2009/0113733 A1* | 5/2009 | Hale .................. | G01C 9/12 |
| | | | 33/375 |

* cited by examiner

LEVELING AND DISTANCE-MEASURING SYSTEMS

CROSS-REFERENCE TO RELATED APPLICATION

The present application is related to and claims priority from prior provisional application Ser. No. 61/188,592, filed Jul. 3, 2015 which application is incorporated herein by reference in its entirety.

BACKGROUND OF THE INVENTION

The following includes information that may be useful in understanding the present disclosure. It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of measuring devices and more specifically relates to leveling systems and distance-measuring systems.

2. DESCRIPTION OF RELATED ART

During construction, it is often necessary to determine a plumb vertical plane and a level horizontal plane to ensure structural stability, to maintain a clean appearance of finished product, and to ensure construction is completed to the desired specifications. Also, it is often useful to determine the location of an existing stud located within a wall without the need to remove or alter the existing wall.

One common device to determine plumb and/or level is a laser level. A laser level is a tool which employs the use of a laser beam projector which is leveled according to the accuracy of the device and projects a fixed beam along the horizontal and/or vertical axis. In order to determine the location of a stud, a stud finder is often the tool of choice for a construction tradesperson. A stud finder is a device used to locate framing studs located within a wall surface, usually behind drywall. A more primitive method of locating studs includes the tapping or knocking along a wall surface to listen to the change in tone of the knock.

A limitation with the exiting device to determine plumb, determine level, and locate studs is that there is a need for multiple tools and devices with can be cumbersome and time consuming to use. A suitable solution is desired.

Several attempts have been made to solve the above-mentioned problems such as those found in U.S. App. Pub. No. 2004/0118001 to Turpin, U.S. App. Pub. No. 2006/0179672 to Tacklind, U.S. Pat. No. 6,459,483 to Shafer et al., U.S. Pat. No. 7,027,480 to Marshall et al., and U.S. Pat. No. 7,350,303 to Rock et al. These documents are representative of measuring devices. However, none of the above references, taken either singly or in combination, is seen to describe the invention as claimed.

BRIEF SUMMARY OF THE INVENTION

In view of the foregoing disadvantages inherent in the known measuring devices art, the present invention provides a novel leveling and distance-measuring system. The general purpose of the present invention, which will be described subsequently in greater detail is to provide a device useful for measuring a distance between two objects, determining and displaying a level plane and a plumb plane, and locate and measure wall studs.

A system for leveling and distance-measuring is disclosed herein, the system comprising a housing, a self-leveling-laser fixed to the housing, an electronic-stud-finder fixed to the housing, a distance-measurer having distance-measuring-circuitry, a display detachably coupled to the housing, and an audio-output including variable-frequency-output and variable-tone-output.

The system for leveling and distance-measuring also includes at least one mode-selector-switch, configured to select a mode-of-operation of the system from at least a leveling mode and a distance-measuring mode. The system is structured and arranged to determine level, plumb, measure distances, locate studs embedded within walls, and measure a width of the studs.

The self-leveling laser includes a laser-unit having a laser-diode and drive-circuitry, a plurality of accelerometers including a differential-capacitor, with the plurality of accelerometers and the differential-capacitor configured to operate in functional combination to measure a level-metric relative to the housing, and a visual-level-indicator configured to provide a user with a visual indication of the level-metric.

The electronic-stud-finder including a stud-locator configured to locate a stud in a wall, and a stud-width-measurer configured to measure a width of the stud. The electronic-stud-finder includes at least one dielectric-sensor, includes at least one sonic-sensor, and one of magnetic-sensor to allow the user to determine the location of studs of a variety of materials (e.g., wood, metallic, plastic, etc.).

The distance-measuring-circuitry and the self-leveling-laser operate in functional combination to provide the user with measurement of distance, displayable upon the detachable-display. The display includes a first-visual-indicator configured to display a wall-stud presence, and a second-visual-indicator configured to display a wall-stud width, the first-indicator being in functional combination with the second-indicator. An audio-output is also included, audio-output including variable-frequency-output and variable-tone-output to provide the user with different audio alerts to alert the user of different conditions (e.g., plumb, level, metallic wall stud, wooden wall stud, low battery, error, etc.).

The housing includes a flat-bottom configured to stand upright when placed upon a flat-horizontal-surface and includes a flat-backside configured flush against a flat-vertical-surface. Preferably, the housing additionally includes a tripod-mount configured to allow the user to removably affix the system upon a tripod stand. The system also includes a discontinuity in the housing, where the discontinuity is configured to provide a location for the user to place a mark upon a surface (e.g., wall, etc.), in the preferred embodiment.

The housing of the system, in the preferred embodiment, is constructed from a plastic-material, and is configured to provide durability and longevity during use, with the housing configured to have increased visibility, and is colored in a bright-color (e.g., neon, reflective, yellow, orange, red, or other colors with high saturation, etc.). The system further includes a battery-power supply configured to be removable, replaceable, and rechargeable, in the preferred embodiment.

According to another embodiment, a method for using a leveling and distance-measuring system is also disclosed herein. The method for using the leveling and distance-measuring system may include the steps of providing a leveling and distance-measuring system, placing the leveling and distance-measuring system upon a flat-vertical-surface, utilizing the leveling and distance-measuring system to determine the degree of plumb of the flat-vertical-surface, and viewing the degree of plumb of the flat-vertical-surface upon a detachable-display, placing the leveling and distance-measuring system upon a flat-horizontal-surface, utilizing the leveling and distance-measuring system to determine the degree of level of the flat-vertical-surface, viewing the degree of level of the flat-vertical-surface upon the detachable-display, placing the leveling and distance-measuring system between two-objects, utilizing the leveling and distance-measuring system to determine a distance between the two-objects, and viewing the distance between said two-objects on the detachable-display.

The present disclosure holds significant improvements and serves as a measuring device. Preferably, a leveling and distance-measuring system should provide a device to allow a user to determine distances between objects, determine both a plumb plane and a level plane, and locate wall studs, and yet, would operate reliably and be manufactured at a modest expense. Thus, a need exists for a reliable leveling and distance-measuring system to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and method(s) of use for the present disclosure, constructed and operative according to the teachings of the present disclosure.

The various embodiments of the present invention will hereinafter be described in conjunction with the appended drawings, wherein like designations denote like elements.

DETAILED DESCRIPTION

Figure 1:
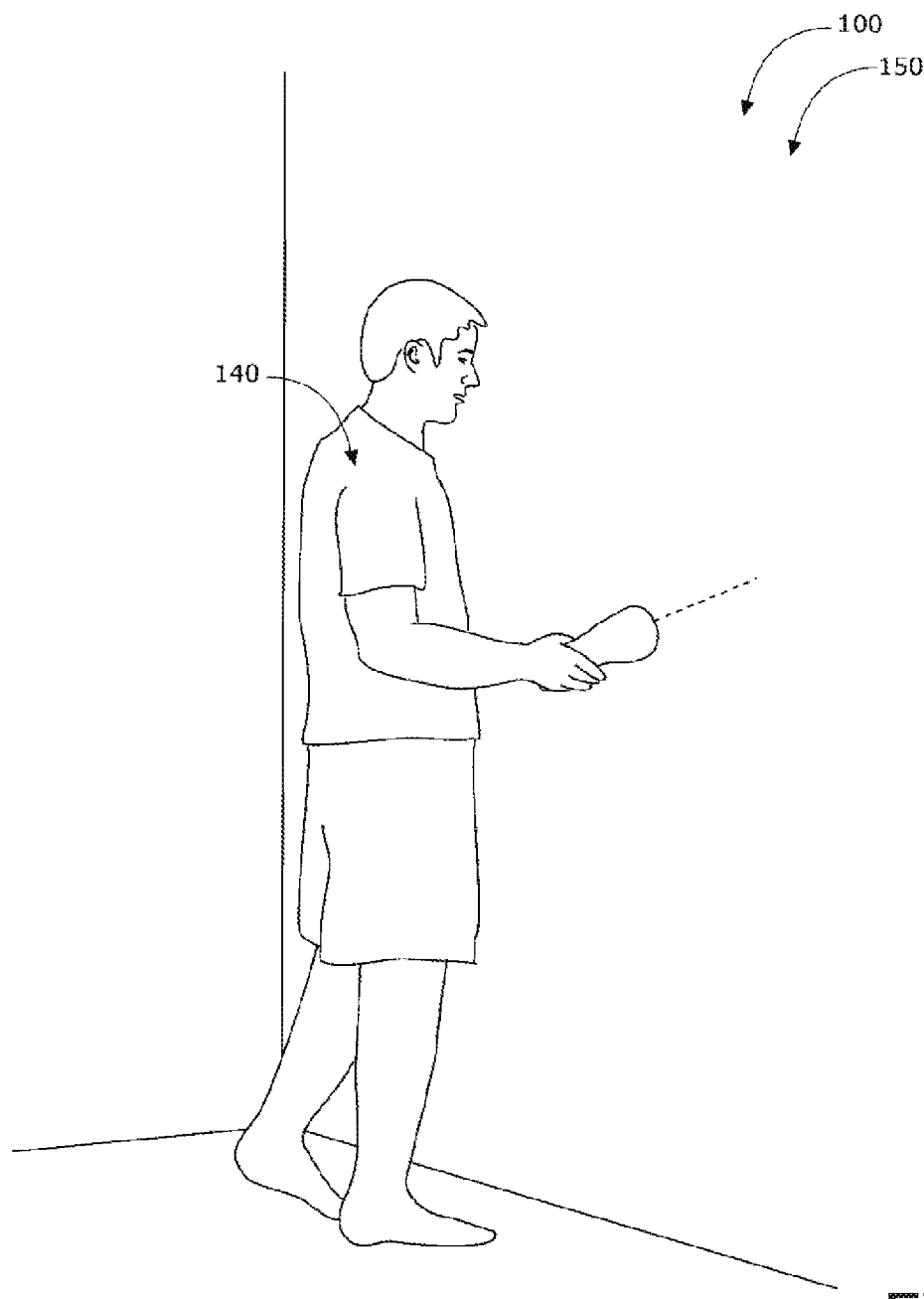
FIG. 1 is a perspective view, illustrating a leveling and distance-measuring system during an 'in-use' condition, according to an embodiment of the disclosure.
Figure 2:
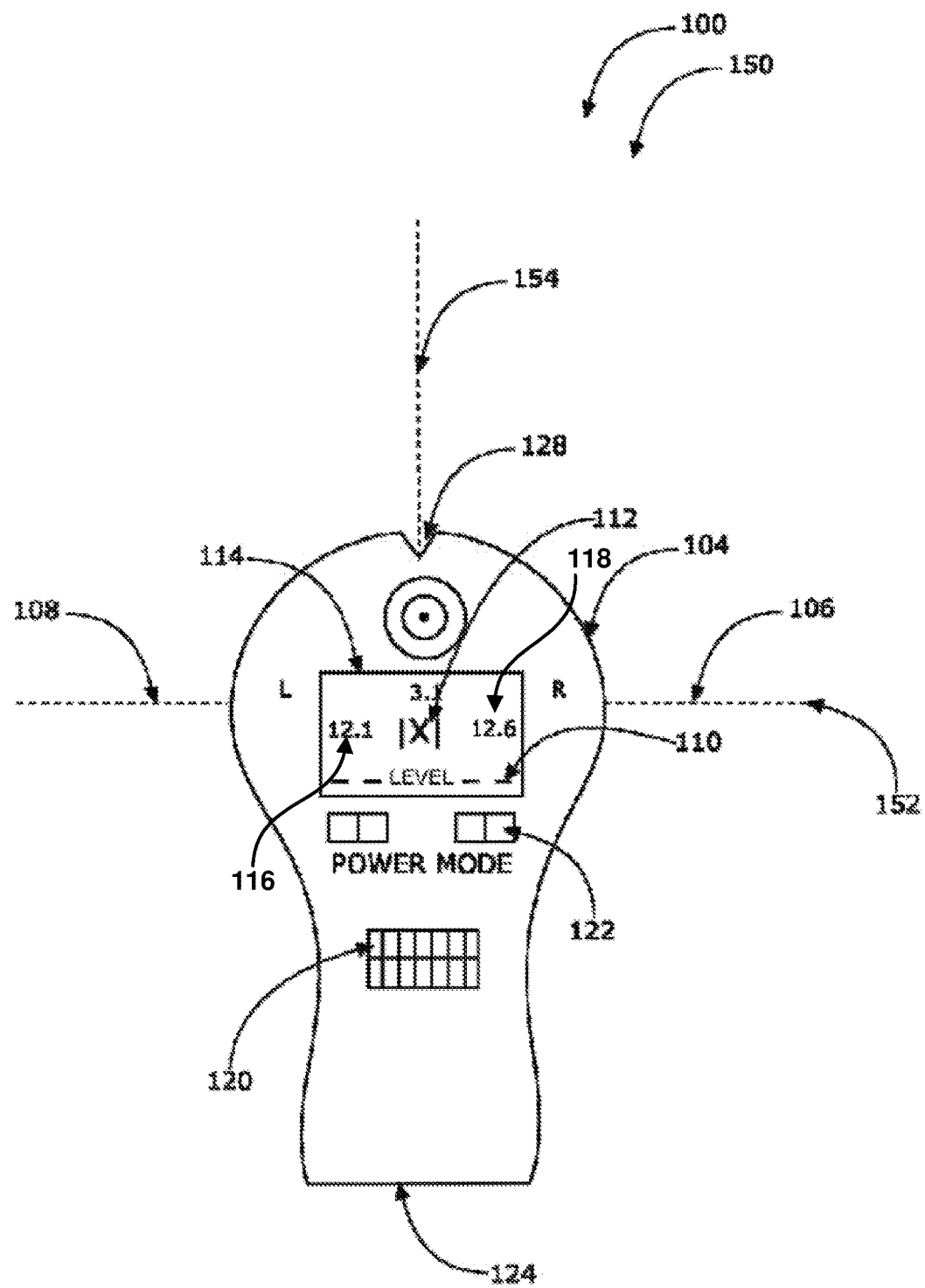
FIG. 2 is a front view, illustrating the leveling and distance-measuring system, according to an embodiment of the disclosure.
Figure 3:
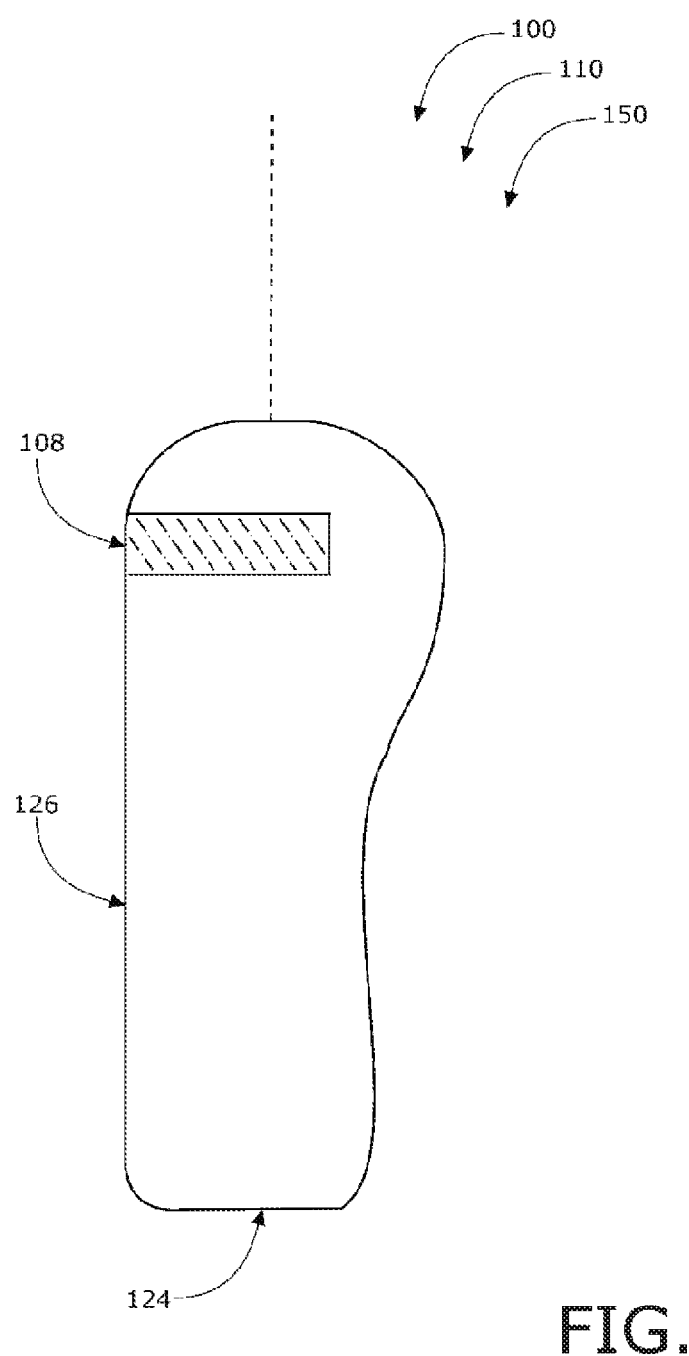
FIG. 3 is a side view, the illustrating leveling and distance-measuring system, according to an embodiment of the disclosure.
Figure 4:
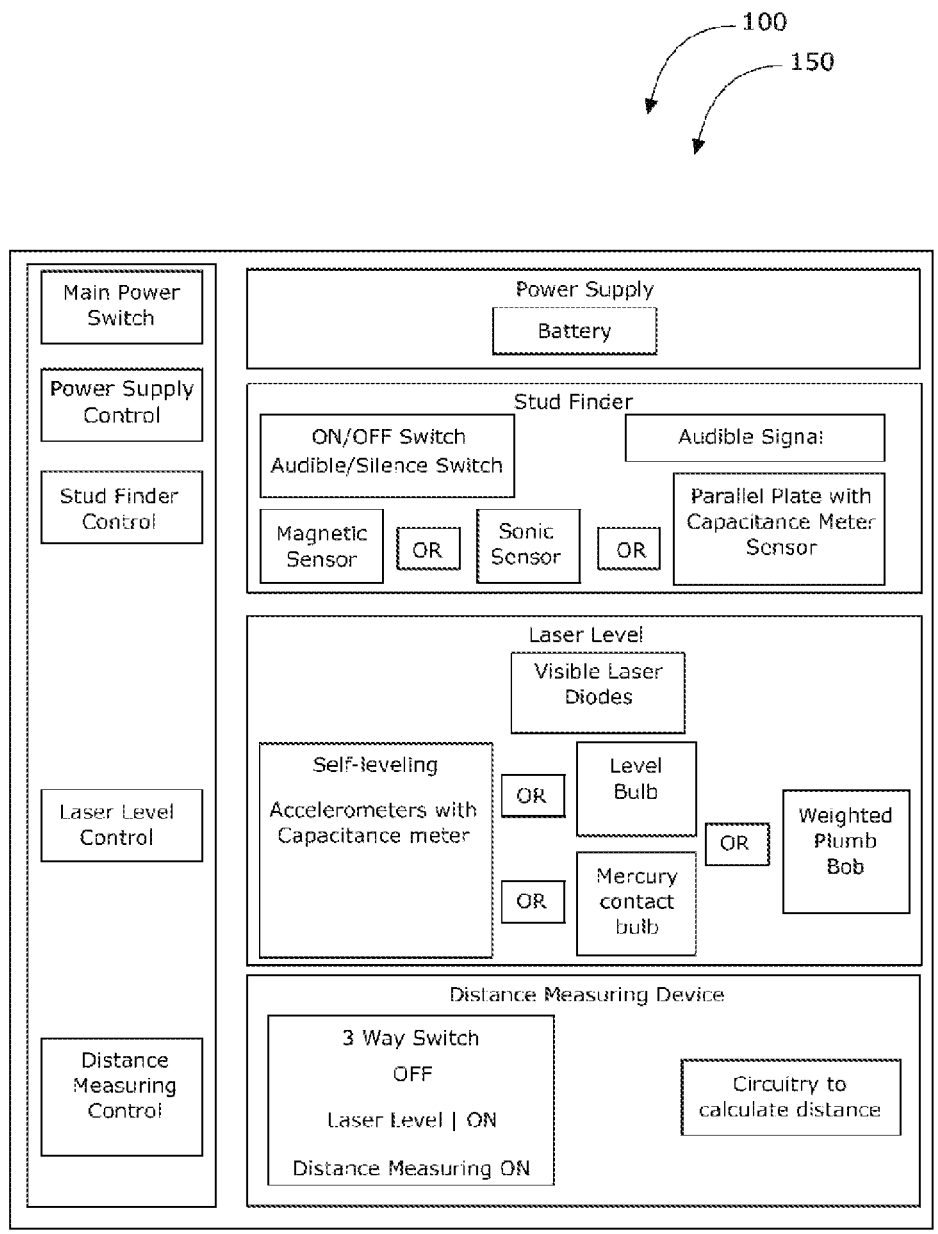
FIG. 4 is a diagram view, illustrating the leveling and distance-measuring system, according to an embodiment of the disclosure.

As discussed above, embodiments of the present disclosure relate to a distance measuring device, and more particularly to a leveling and distance-measuring system as used to improve the measuring of distances, determination of plumb and level, and locating and measuring of wall studs.

Generally speaking, a leveling and distance-measuring system is a portable apparatus comprising a self-leveling-laser, a distance measuring device, and an electronic-stud-finder in a single device housing. Alignment of the distance measuring device is ensured by the self-leveling-laser. The electronic-stud-finder is implemented by a sensor in the device which, when moved along a flat surface, indicates a change in the density of the wall structure, indicating the presence of a wall stud. The self-leveling-laser uses a common solid-state laser mounted to provide a bright long laser line in up to four directions of the apparatus indicating level and plumb planes. The distance measuring device also uses a laser source coupled to a detecting circuit to calculate and display its distance to objects.

In practical use, the user will use the stud finding function to find a wall stud and the distance measuring device will indicate the distance to a wall, door frame, or other object to the right, left, up, or down while projecting a laser beam on the flat surface, such as a wall. The user can quickly locate an adjacent stud by using any marking device, such as a pencil or nail, to break the laser beam and the distance will be indicated to the marking device. The marking device will be moved along the beam until the desired distance is indicated. For example, an adjacent stud might be found at the standard distance if sixteen inches shown on the device.

Another application of the device is to measure the distance from the device to an object up and down on a flat surface such as a wall. The device will display the distance to objects in any direction, allowing the user to adjust the position of the device to measure the distance from an object above or below the device such as a picture, shelf, ceiling, or floor, to quickly set the alignment and separation of the objects. Incorporating the feature of a stud finder, distance measuring device, and self-leveling laser, will allow a single user to hang pictures, shelves, cabinets, or other items, quickly and without the need of help of a second person.

Referring now more specifically to the drawings by numerals of reference, there is shown in FIGS. 1-4, various views of a leveling and distance-measuring system 100 structured and arranged to determine level, plumb, measure distances, locate studs embedded within walls, and measure the width of the studs.

In embodiments, system 100 for leveling and distance-measuring may include a housing 104, a self-leveling-laser 106 and an electronic-stud-finder 112, with the self-leveling-laser 106 and the electronic-stud-finder 112 fixed to housing 104. The system 100 may further include a distance-measurer, having distance-measuring-circuitry, a detachable-display 114 that is detachably coupled to the housing 104, an audio-output 120, and at least one mode-selector-switch 122. The distance-measurer is configured to measure a distance between the device and a point on a surface (e.g., a wall or post). The mode-selector-switch 122 is configured to select a mode of operation of system 100 from at least a leveling mode and a distance-measuring mode. Some embodiments of system 100 for leveling and distance-measuring may include more mode-selector-switches 122, which may additionally include a stud finding mode and a stud measuring mode. Some embodiments of system 100 for leveling and distance-measuring may further include a non-electronic-visual-level (e.g., bubble-level, etc.). System 100 may also include a battery-power supply configured to be removable, replaceable, and rechargeable.

The distance-measuring-circuitry and self-leveling-laser 106 operate in functional combination to provide a user 140 with measurement of distance, displayable upon detachable-display 114. In some embodiments of detachable-display 114 may include a liquid-crystal-display screen or a light-emitting-diode-display 114 screen. Further embodiments may include different types of detachable-display 114 depending upon user preferences and specific applications.

Embodiments of the system 100 for leveling and distance-measuring may include the housing 104 including a flat-bottom 124 configured to stand upright when placed upon a flat-horizontal-surface, and may also include a flat-backside 126 configured to abut flush against a flat-vertical-surface. Housing 104 may further include a tripod-mount configured to allow user 140 to removably affix system 100 upon a tripod stand, and self-leveling-laser 106 may further include a locking-swivel-mount. Housing 104 may include a handle configured to aid user 140 in securing system 100 without interfering with the operations of system 100.

Additionally, housing 104 may further include discontinuity 128 such as a sight, opening, or groove. In particular, the discontinuity 128 is configured to provide a location for user 140 to place a mark upon a surface without the need to move system 100 prior to placing the mark. For example, and as illustrated, the discontinuity 128 may be embodied as a cutout (here, a v-shaped notch) in an otherwise continuous edge/side of the housing 104.

Housing 104 may be constructed from a plastic-material, and be configured to provide durability and longevity during use. Also housing 104 may be configured to have increased visibility, and be colored in a bright-color.

Detachable-display 114 may be detachably coupled to housing 104, detachable-display 114 may have a first-visual-indicator 116 configured to display a wall-stud presence and second-visual-indicator 118 configured to display a wall-stud width, first-visual-indicator 116 being in functional combination with second-visual-indicator 118.

Electronic-stud-finder 112 may comprise a stud-locator configured to locate a stud in a wall, and a stud-width-measurer configured to measure a width of the stud. In some embodiments electronic-stud-finder 112 may further include at least one dielectric-sensor, at least one sonic-sensor, and/or at least one of magnetic-sensor useful for locating wall studs of different materials, as well as different construction methods.

Self-leveling-laser 106 may be fixed to housing 104 internally and include a laser-unit 108 having a laser-diode and drive-circuitry, plurality of accelerometers including a differential-capacitor, the plurality of accelerometers and the differential-capacitor may be configured to operate in functional combination to measure a level-metric (e.g., degrees, radians, level/not level, etc.), relative to the housing 104 (or a portion thereof), and the visual-level-indicator 110 may be configured to provide user 140 with a visual indication of the level-metric.

The audio-output 120 may include variable-frequency-output and variable-tone-output the audio-output 120 may be configured to provide user 140 with a different audio indications relative to different alerts, measurements and conditions during use.

Leveling and distance-measuring system 100 may be arranged as a kit including the system 100 having at least one detachable-display 114, at least one tripod, a set of batteries, and a set of user instructions. The instructions may indicate or explain operation and functional relationships in relation to the structure of the system (such that the system can be used, maintained, or the like in a preferred manner).

The leveling and distance-measuring system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
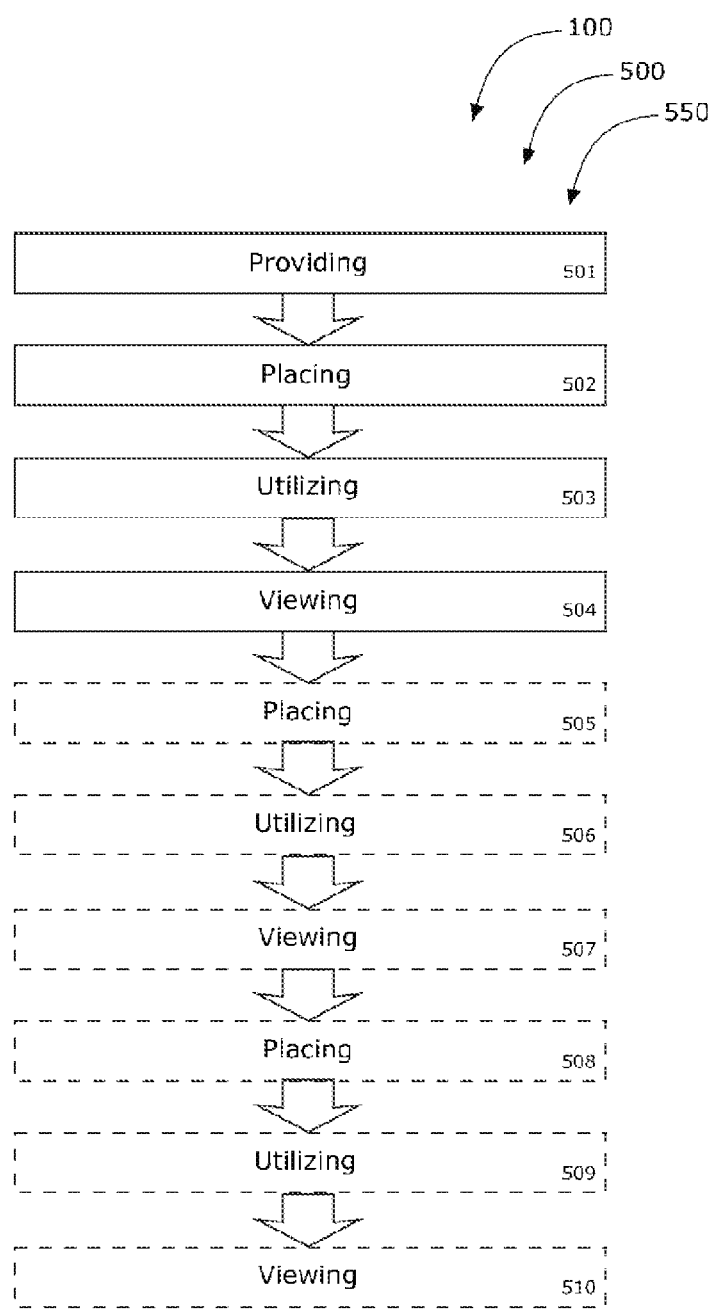
FIG. 5 is a flow diagram, illustrating a method of use for the leveling and distance-measuring system, according to an embodiment of the disclosure.

Referring now to FIG. 5, a flow diagram 550 illustrates a method of use 500 for the leveling and distance-measuring system 100, according to an embodiment of the present disclosure. As shown, the method of use 500 may comprise the steps of: step one 501, providing a leveling and distance-measuring system 100; step two 502, placing the leveling and distance-measuring system 100 against a flat-vertical-surface; step three 503, utilizing leveling and distance-measuring system 100 to determine the degree of plumb 154 of the flat-vertical-surface; step four 504, viewing the degree of plumb 154 of the flat-vertical-surface upon detachable-display 114; step five 505, placing leveling and distance-measuring system 100 upon a flat-horizontal-surface; step six 506, utilizing leveling and distance-measuring system 100 to determine the degree of level 152 of the flat-vertical-surface; step seven 507, viewing the degree of level 152 of the flat-vertical-surface upon a detachable-display 114; step eight 508, placing leveling and distance-measuring system 100 between two-objects; step nine 509, utilizing leveling and distance-measuring system 100 to determine a distance between the two-objects; and step ten 510, viewing the distance between the two-objects on aid detachable-display 114.

It should be noted that steps six through ten (506, 507, 508, 509, and 510) are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112(f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for leveling and distance-measuring, said system comprising:
   a housing;
   a self-leveling-laser fixed to said housing, said self-leveling-laser including
      a laser-unit having a laser-diode and drive-circuitry,
      a plurality of accelerometers including a differential-capacitor, said plurality of accelerometers and said differential-capacitor configured to operate in functional combination to measure a level-metric relative to said housing,
      a visual-level-indicator configured to provide a user with a visual indication of said level-metric;
   an electronic-stud-finder fixed to said housing, said electronic-stud-finder including a stud-locator configured to locate a stud in a wall, and a stud-width-measurer configured to measure a width of said stud;
   a distance-measurer having distance-measuring-circuitry, said distance-measurer configured to measure a distance between the device and a point on a surface;
   a detachable-display detachably coupled to said housing, said detachable-display having
      a first-visual-indicator configured to display a wall-stud presence, and
      a second-visual-indicator configured to display a wall-stud width, said first-visual-indicator being in functional combination with said second-visual-indicator;
   an audio-output including variable-frequency-output and variable-tone-output; and
   at least one mode-selector-switch, configured to select a mode-of-operation of said system from at least at least a leveling mode and a distance-measuring mode;
   wherein said distance-measuring-circuitry and said self-leveling-laser operate in functional combination to provide said user with measurement of distance displayable upon said detachable-display;
   wherein said system is structured and arranged to determine level, plumb, measure distances, locate studs embedded within walls, and measure widths of said studs.

2. The system of claim 1, wherein said electronic-stud-finder further includes at least one dielectric-sensor.

3. The system of claim 1, wherein said electronic-stud-finder further includes at least one sonic-sensor.

4. The system of claim 1, wherein said electronic-stud-finder further includes at least one magnetic-sensor.

5. The system of claim 1, wherein said self-leveling-laser further includes a locking-swivel-mount.

6. The system of claim 1, further comprising a non-electronic-visual-level.

7. The system of claim 1, wherein said detachable-display includes a liquid-crystal-display screen.

8. The system of claim 1, wherein said detachable-display includes a light-emitting-diode-display screen.

9. The system of claim 1, wherein said housing includes a flat-bottom configured to stand upright when placed upon a flat-horizontal-surface.

10. The system of claim 1, wherein said housing further includes a flat-backside configured abut flush against a flat-vertical-surface.

11. The system of claim 1, wherein said housing includes a tripod-mount configured to allow said user to removably affix said system upon a tripod stand.

12. The system of claim 1, wherein said housing includes a handle configured to aid said user in securing said system without interfering with operations of said system.

13. The system of claim 1, wherein said housing further includes a discontinuity in said housing, said discontinuity configured to provide a location for said user to place a reference mark upon a surface without moving the housing.

14. The system of claim 1, wherein said housing is constructed from a plastic-material, and is configured to provide durability and longevity during use.

15. The system of claim 1, wherein said housing is configured to have increased visibility, and is colored in a bright-color.

16. The system of claim 1, wherein said system further comprises a battery-power supply configured to be removable, replaceable, and rechargeable.

17. A system for leveling and distance-measuring, said system comprising:
   a housing;
   a self-leveling-laser fixed to said housing, said self-leveling-laser including
      a laser-unit having a laser-diode and drive-circuitry,
      a plurality of accelerometers including a differential-capacitor, said plurality of accelerometers and said differential-capacitor configured to operate in functional combination to measure a level-metric relative to said housing,
      a visual-level-indicator configured to provide a user with a visual indication of said level-metric;
   an electronic-stud-finder fixed to said housing, said electronic-stud-finder including a stud-locator configured to locate a stud in a wall, and a stud-width-measurer configured to measure a width of said stud;
   a distance-measurer having distance-measuring-circuitry;
   a detachable-display detachably coupled to said housing, said detachable-display having
      a first-visual-indicator configured to display a wall-stud presence, and
      a second-visual-indicator configured to display a wall-stud width, said first-visual-indicator being in functional combination with said second-visual-indicator;
   an audio-output including variable-frequency-output and variable-tone-output;
   at least one mode-selector-switch configured to select a mode-of-operation of said system from at least at least a leveling mode and a distance-measuring mode; and
   a battery-power supply configured to be removable, replaceable, and rechargeable;
   wherein said distance-measuring-circuitry and said self-leveling-laser operate in functional combination to provide said user with measurement of distance displayable upon said detachable-display;
   wherein said system is structured and arranged to determine level, plumb, measure distances, locate studs embedded within walls, and measure a width of said studs;
   wherein said electronic-stud-finder includes at least one of a dielectric-sensor, a sonic-sensor, and a magnetic-sensor;
   wherein said housing includes a flat-bottom configured to stand upright when placed upon a flat-horizontal-surface;
   wherein said housing includes a flat-backside configured abut flush against a flat-vertical-surface;
   wherein said housing includes a tripod-mount configured to allow said user to removably affix said system upon a tripod stand;

wherein said housing includes a discontinuity in said housing, said discontinuity configured to provide a location for said user to place a reference mark upon a surface without moving the housing;

wherein said housing is constructed from a plastic-material, and is configured to provide durability and longevity during use; and wherein said housing is configured to have increased visibility, and is colored in a bright-color.

18. The system of claim 17, further comprising:
at least one tripod;
at least one set of batteries; and
a set of user instructions;
wherein said system is arranged as a kit.

19. A method of using the leveling and distance-measuring system of claim 17, the method comprising the steps of:
providing a leveling and distance-measuring system;
placing said leveling and distance-measuring system against a flat-vertical-surface;
utilizing said leveling and distance-measuring system to determine a degree of plumb of said flat-vertical-surface; and
viewing said degree of plumb of said flat-vertical-surface upon a detachable-display.

20. The method of claim 19, further comprising the steps of:
placing said leveling and distance-measuring system upon a flat-horizontal-surface;
utilizing said leveling and distance-measuring system to determine a degree of level of said flat-vertical-surface;
viewing said degree of level of said flat-vertical-surface upon said detachable-display;
placing said leveling and distance-measuring system between two-objects;
utilizing said leveling and distance-measuring system to determine a distance between said two-objects; and
viewing said distance between said two-objects on said detachable-display.

\* \* \* \* \*